United States Patent
Walker

(10) Patent No.: US 12,307,541 B2
(45) Date of Patent: May 20, 2025

(54) RIDE SHARE SYSTEM REQUIRING APPROVALS

(71) Applicant: Pull Up Transportation Solutions L.L.C., Minneapolis, MN (US)

(72) Inventor: Kimberly Feyth Walker, Brooklyn Park, MN (US)

(73) Assignee: Pull Up Transportation Solutions L.L.C., Minneapolis, MN (US)

( * ) Notice: Subject to any disclaimer, the term of this patent is extended or adjusted under 35 U.S.C. 154(b) by 0 days.

(21) Appl. No.: 18/196,064

(22) Filed: May 11, 2023

(65) Prior Publication Data
US 2024/0378690 A1   Nov. 14, 2024

(51) Int. Cl.
| | | |
|---|---|---|
| G06Q 30/02 | (2023.01) | |
| G06Q 20/22 | (2012.01) | |
| G06Q 50/40 | (2024.01) | |
| G06Q 20/36 | (2012.01) | |
| G06Q 30/0214 | (2023.01) | |
| G06Q 50/26 | (2012.01) | |

(52) U.S. Cl.
CPC ......... G06Q 50/40 (2024.01); G06Q 20/2295 (2020.05); *G06Q 20/36* (2013.01); *G06Q 30/0214* (2013.01); *G06Q 50/265* (2013.01)

(58) Field of Classification Search
CPC .... G06Q 50/30; G06Q 20/2295; G06Q 20/36; G06Q 30/0214; G06Q 50/265; G06Q 30/0207–30/0277
See application file for complete search history.

(56) References Cited

U.S. PATENT DOCUMENTS

| | | | | |
|---|---|---|---|---|
| 2016/0364678 A1* | 12/2016 | Cao | .................... | G06Q 10/083 |
| 2016/0364823 A1* | 12/2016 | Cao | .................... | G06Q 50/40 |
| 2018/0260787 A1* | 9/2018 | Xi | .................... | G06Q 10/1095 |
| 2018/0293687 A1* | 10/2018 | Hardee | ............ | G06Q 10/06315 |
| 2018/0341945 A1* | 11/2018 | Welborn | ............ | G06Q 30/0226 |
| 2020/0104875 A1* | 4/2020 | Chintakindi | ............ | H04W 4/40 |
| 2020/0349345 A1* | 11/2020 | Hodge | .................... | G06V 20/59 |
| 2020/0349666 A1* | 11/2020 | Hodge | .............. | G01C 21/3602 |
| 2021/0073825 A1* | 3/2021 | Walling | ................ | G06Q 50/40 |
| 2021/0081688 A1* | 3/2021 | Bazargan | ............... | G06V 40/10 |
| 2023/0100629 A1* | 3/2023 | Gerrese | .................. | G06F 21/36 726/17 |

FOREIGN PATENT DOCUMENTS

WO   WO 2021/097381 A1 *  11/2020
WO   WO 2022/236108 A1 *  5/2021

* cited by examiner

*Primary Examiner* — Thuy N Nguyen
(74) *Attorney, Agent, or Firm* — Brooks, Cameron & Huebsch, PLLC

(57) ABSTRACT

Devices, methods, and systems for a ride share system requiring approvals are described herein. A first user requests a rideshare which is processed by a remote computer resource which gets approval from a second user. The remote computer resource then pairs a driver with the approved rideshare wherein the driver can accept the rideshare. An authentication code is then generated to verify the identity of the parties when the driver gets to the pickup location. In some examples the second user can request a rideshare for the first user, and then approve the rideshare. A rear facing camera can be accessed by the second user to monitor the rideshare in progress. A secondary adult contact information can be added to the rideshare for added safety of the first user.

6 Claims, 7 Drawing Sheets

RIDE SHARE SYSTEM REQUIRING APPROVALS

BACKGROUND

There are several applications on a mobile device that an adult can use to request transportation from one location to another. These rideshare apps allow a user to input a ride request and the system will issue the ride share to a driver active in the system at the time and direct them to the pickup location. The user will then be transported to the drop-off location where the ride will complete and the payment will be processed with an additional optional tip.

DETAILED DESCRIPTION

Figure 1:
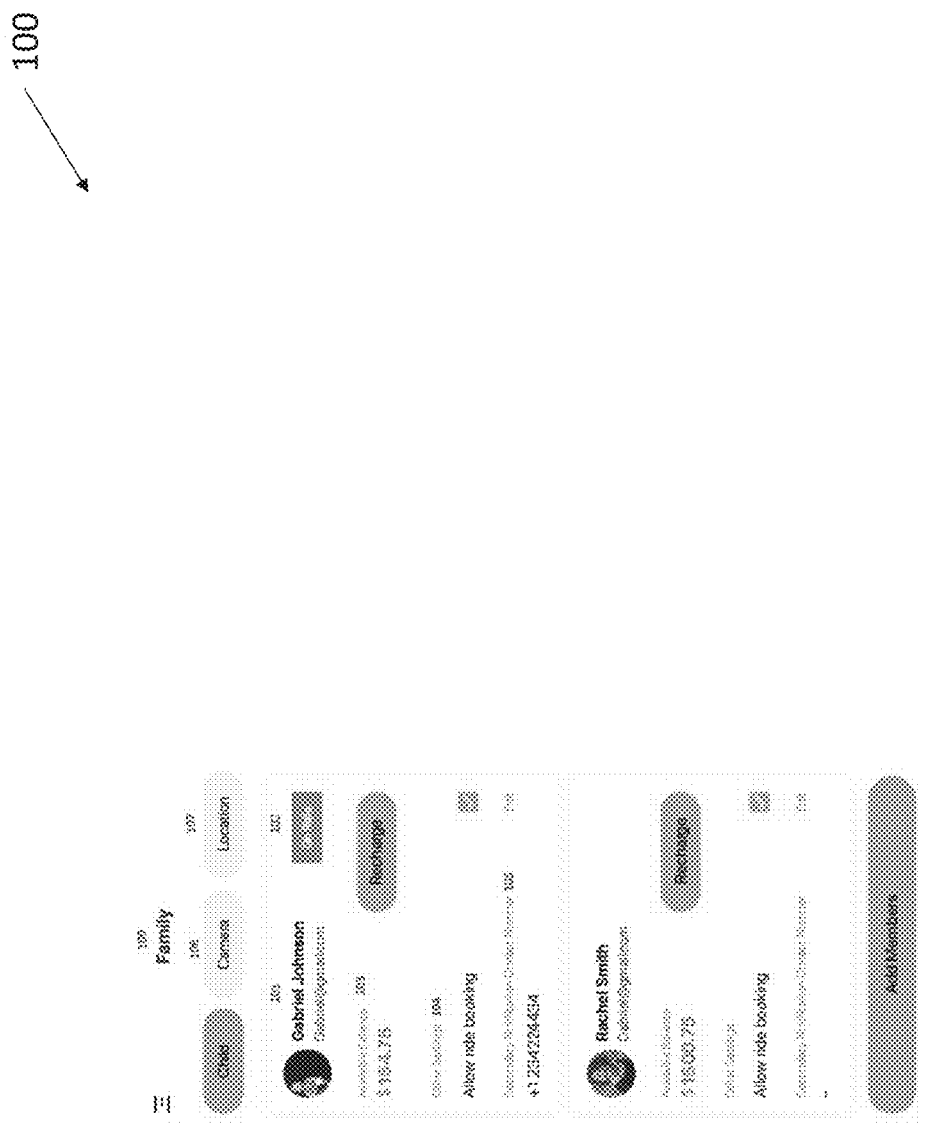
FIG. 1 is an example of a family view showing an overview of the family according to one or more embodiments of the present disclosure.

The limitations of the current art are that they only accept adults into the system, and are primarily requested by individuals. This causes a problem with today's busy parents who are trying to juggle their busy schedules while trying to provide transportation for their minor children to and from school or activities or friend's houses. There also is a need for an organization or entities to coordinate or request rideshares for others and not simply for the individual themselves. For example, elderly relatives may also need supervision or direction when utilizing ride share services.

The present disclosure provides a system that allows a dependent (e.g., minor child, elderly person, person in need of supervision, etc.) to request a rideshare or for the guardian (e.g., parent, adult, supervisor, etc.) to request a rideshare on behalf of the dependent. Although specific embodiments herein describe examples of minor children, other possible dependents are also envisioned. This allows a minor child or other dependent to be able to get access to the transportation when it is needed and not have to wait around for their parents to be available or be denied opportunities because of lack of transport. The present disclosure can also be implemented where another entity such as a school official, a medical health plan provider, and/or a coach can request and/or approve rides for other people.

As used herein a rideshare, ride share, or a ride are interchangeable in this application and could mean any type of transportation service wherein a user requests transportation from a first location to a second location. This could be in the form of an application on a mobile device where a user requests vehicle transportation between two locations. In some examples a user can request a rideshare for a different user, and other examples a user can request a rideshare for themselves with the approval of another party. It is also understood that the rideshare could be requested for one person or multiple people. The rideshare could be a private or concierge service. The rideshare could also be a carpool where there are multiple people being transported to different locations in the same vehicle.

As used herein, a minor, a minor child, or a child can include a human under the legal age (e.g., under the legal age of consent within a particular country, under the age of 18 within the United States of America, etc.). Where specified, a minor can be a certain age range such as 5-12 for certain embodiment and features and between 13-17 for other embodiment or features of the invention. It should be known that the specific age cut offs can be different and still be covered by this invention. Such as the cutoff age between certain features being at age 10 instead of age 13 in some instances. Or the lower end range for minor children being able to use the invention could be lowered to age 3 for instance.

A rideshare system requiring approvals including devices, methods, and systems are described herein. For example, one or more embodiments can include a parental computing device that is linked to a minor child's computing device through a family view. A parent or the minor child can request a ride share for the child to be transported from point A to point B (e.g., from a first location to a second location, etc.). When the parent and the driver accepts the ride, an authentication code can be generated and presented to the parent, the child, and/or the driver. The driver can then go to the pickup location and verify with the child utilizing the authentication code and can then start the ride. For example, the driver can present the authentication code to the child and the child can compare the authentication code from the driver. In some embodiments, the child can capture an image of the authentication code to verify the authentication code. This image capture authentication can confirm through an automated process that the driver is correct. A notification that the authentication code is confirmed can be provided to the parent.

In some embodiments, the parent can be presented with the trip details so the parent can monitor the ride as it is in progress. This can include information such as the location of the vehicle, a description of the vehicle, the authentication code, the confirmation that the authentication code was scanned and authenticated, and/or the proposed route the driver will take. The child will be presented with the same information so they can verify the authentication code with the driver and make sure they are going to the right place. There can also be an additional safety feature for the parent or the child to be able to contact emergency services. In these embodiments, the information within the application can be provided to the emergency services. This could be for a variety of situations where those services would be necessary such as a medical emergency or if they were in an accident or witness to an accident.

As used herein an authentication code could be any combination of letters, numbers, and/or symbols. The code could be pre-generated any time before the ride share or only generated at the time the rideshare is accepted by the driver. It is also understood that the authentication code could be on a timer to expire after a certain amount of time and a new code would be generated or be a static code for the duration of the rideshare. It is also understood that this code could be reused from a previous rideshare, or be a completely new code for every new rideshare.

As used herein, a pickup is a first location where a rideshare starts and a drop-off location is a second location where the rideshare ends for a particular user. A user is picked up or enters the vehicle at the pickup location. A user is dropped off or exits the vehicle at a drop-off location. It is understood that there could be multiple pickup and drop-off locations in a rideshare. There could be multiple users being picked up and dropped off at multiple locations all in one rideshare.

As used herein, the term computing device refers to an electronic device having a processor and a memory resource. Examples of computing devices include, for instance a laptop computer, a notebook computer, a desktop computer, an all-in-one (AIO) computing device, and/or a mobile device (e.g., a smart phone, tablet, personal digital assistant, smart glasses, a wrist-worn device, etc.), among other types of computing devices. The computing device can communicate with a remote computing device to perform certain tasks. This remote computing device can be in the form of a server, cloud resource, or other computing resource and can be used to store personal information from the users or coordinate activities of the invention.

The computing device can perform a plurality of functions including receiving the request for a rideshare and sending out the approval request to the parents computing device and upon receiving an approval of the rideshare from the parents computing device sending a request to a driver to accept the rideshare. The remote computing device would then be receiving the acceptance of the rideshare and then sending out the authentication code and other rideshare information to the parent's computing device and the minor child's computing device. The remote computing device could then be used to process the payment of the payment or communicate with a separate remote computing device to complete payment of the rideshare. In this way, the remote computing device can operate a platform such as, but not limited to, a cloud service, an application as a service, a platform as a service, and/or other applications that can provide services to remote computing devices.

In some examples, children from ages 5-12 have a different application view than children from ages 13-17. For example, a quantity or type of options available to the children from ages 5-12 can be different than the children from ages 13-17. In this way, the parents can customize the quantity or type of options available to different age ranges of children. This can provide added protection to the children and limit options to children who may abuse particular options. Parents of children from ages 5-12 can book rideshares for their children through the parent's computing device. If the parents opt into the service, children from ages 13-17 are able to book their own rideshare from the child's computing device and the request for a rideshare is only sent to the parents for approval. In this example, the child user can utilize the computing device to input the pickup and drop-off locations to simplify the logistics with coordinating with the parent. In a similar way, parents can customize the options for older children to give them more deference to where they are going and what they are doing and would only have to authorize the transaction so they are aware of their child's location and responsible for the payment of the service.

Although an adult and child relationship is described between a parent and a child, the present disclosure is not so limited. In some examples, the parent and child relationship can be substituted, for example, by a coach and players on a sports team, a school district and a student, a medical health plan and a patient, a bar and an intoxicated patron, a company and employees, and/or an airline and its passengers. It will be understood in the art that the implementation of the invention will be consistently applied across a diverse group of relationships. In some examples the coach of a sports team can request a rideshare, or a series of rideshares for the teammates and approve the transactions. In some examples, a school district will request a rideshare for a special needs student and approve for and pay for the rideshare for that student. In other examples a medical health plan could put in a request for a rideshare of a patient with the medical health plan and approve and pay for the rideshare. In some instances, the patient can request the rideshare and get approval by the medical health plan which would then pay for the rideshare for the patient. In some examples, a bar can request a rideshare for an intoxicated patron to avoid liability. In some examples, a company can be requesting a rideshare for their employee for various reasons such as they are traveling for work in a different city and they don't want a rental car. In other examples, an airline can be requesting a rideshare for their passengers if the flight is diverted to a different airport or if the passenger needs transport to another terminal at the same airport for a connecting flight.

In various examples, additional contact information for an adult can be added to the rideshare request. This second adult contact could be for any adult, but in some embodiments the contact information would be for an adult at the drop-off location. The driver would then be able to contact this secondary adult to make sure they are aware of the child's presence and the driver can transfer responsibility for the child's well-being to this secondary adult at the drop-off location. This would improve the safety of the system by making sure unaccompanied minors are not dropped off at certain locations without an adult being made aware of their presence. This also has the benefit of reducing the liability for the driver by putting the responsibility for the child's well-being on someone else. The driver's primary responsibility for the child should be limited from the time they pick up the minor to the time they drop them off. This additional safety feature helps to reduce situations where an unaccompanied minor is dropped off in an unsafe situation without anyone around to monitor or take care of them.

In various examples, the authentication code is the only unique identifying information provided to the driver. A benefit of this feature is protecting the privacy of the child and reducing the risk from disclosing their full name with anyone. In various examples, the driver would only be presented with information such as the walker family or the central high school is requesting a ride and the authentication code. Using the authentication code, the driver can verify the person getting into their vehicle is the correct one without the negative side effects of requesting a photo identification from a minor.

In various examples, a camera in the cabin of the vehicle can be connected to by the parent to get a video feed during the ride. This additional safety feature can be used by the parent to check in on their child if they are concerned or simply curious what is happening with their child at the time. This feature could be activated in some of the vehicles by a portion of the drivers in on the platform or by all of the vehicles on the platform. The parent would have the ability to request only drivers that have this additional video feed feature installed when they are requesting a ride share or when their child is requesting a ride share.

As used herein, a video feed from a camera could be implemented in small clips of video footage from the vehicle or in one continuous feed from the rear facing camera. This would include video that could be compressed or altered in some way before being presented to the parent's mobile device. This could be for any number of reasons including reducing bandwidth over the cellular network or to resize the video from a native resolution from the camera to one that fits on a cellular device. It is also understood that there is no fixed limit on the length of a clip of video. They could be short 0-15 second clips or longer 15 second to 5 minute clips and it is still anticipated by this disclosure. It is also understood that there could be some delay between the video feed on the camera and the video presented on the cellular device. This could be a deliberate delay set by the system or a natural byproduct of the latency in the network and the speed of data traveling through the various parts of the mobile network.

In various examples, family view is a simplified view showing various information about all of the minor children in the parent's family, or all the players on a sports team, or all the special needs students at the school. Family view can be labeled simply a summary or overview where a company or health plan can easily see all the individuals that are needing a rideshare and a status of all or some of the users. Family view can show information such as the name of the child, the amount of money they have in their digital wallet, the status of the child for whether they are on a ride or not. As used herein, a digital wallet can include financial information related to a particular user. For example, the digital wallet can include credits and/or debits associated with different rides. In one example, the digital wallet is credited with rewards from a successful referral. In some embodiments, the digital wallet can be connected to payment methods, rewards points, and/or other financial information to allow for payments to be provided and/or refunds to be issued to a particular user.

For example, additional reward credits or dollar credits can be provided to an account when the account is associated with a successful referral. The family view can also allow the parent to add a secondary contact for the child, or allow the child to book a ride for themselves. In some examples the family view has multiple tabs to allow the parent to easily switch between the child users for additional information. Some additional tabs could include the option for viewing the camera feed of the cabin of the vehicle, or viewing the location and status of the rideshare.

As used herein family view can be used to connect multiple mobile devices together. A parent could be connected with the child by being able to see information related to the child, or selecting certain settings for a child through the family view. A parent could also be prompted to accept a rideshare request by a child. It is to be understood that the family view could also be named something else to better reflect the use case, such as if the relationship was for a school and a student or a health insurance plan and a patient. The functionality would be the same where the supervisory role would be able to view multiple dependents or persons in one area to more easily track, approve and coordinate movements of individuals or groups of individuals.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

As used herein, "a" or "a number of" something can refer to one or more such things. For example, "a number of users" can refer to one or more users. Additionally, the designator "N", as used herein, particularly with respect to reference numerals in the drawings, indicates that a number of the particular feature so designated can be included with a number of embodiments of the present disclosure.

FIG. 1 is an example of a family view showing an overview of the family. Family view 100 is a summary view of the different members of the family 101 in one place for easier management. In some examples, a parent can easily view the status of a child 102 when they are on a ride, the available balance 103 in their digital wallet, and options for other settings 104 such as allowing the child to book a ride and secondary notification contact 105 information. In some examples, the parent also has the option to view a camera feed 106 of the child during the rideshare or to check their location 107.

Figure 2:
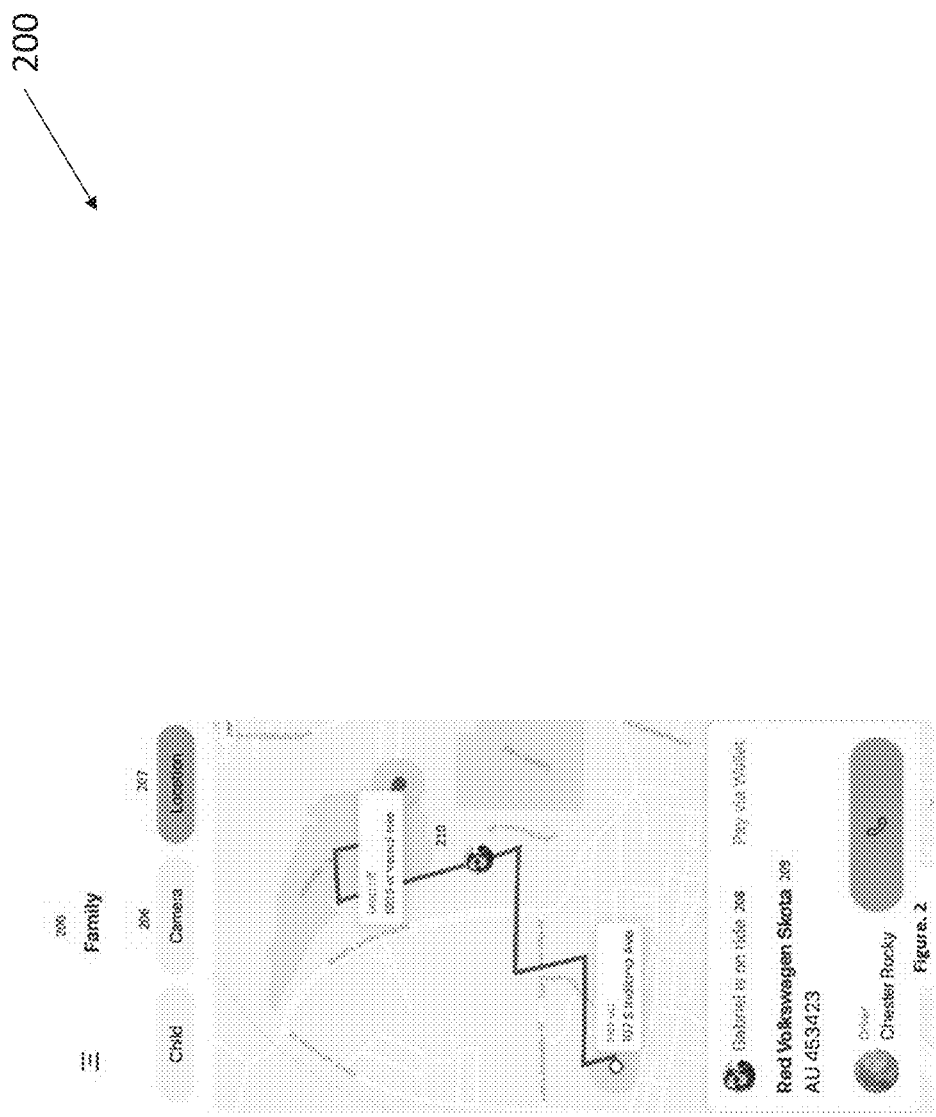
FIG. 2 is an example of a family view tab showing information relating to a child's location according to one or more embodiments of the present disclosure.

FIG. 2 is an example of a family view tab that shows the location of a child on a rideshare. In some examples, the location tab 207 of family view 200 shows the name of the child 208 that is on the rideshare, a description of the vehicle 209 and the location of the vehicle 210 with the route to the drop off location. In some examples, the parent can access the camera tab 206 from this screen to view a camera feed from inside the vehicle for this child. In some examples additional information can be presented on this screen such as the authentication code (not shown) to provide additional information for the parent when they are checking in on their child.

Figure 3:
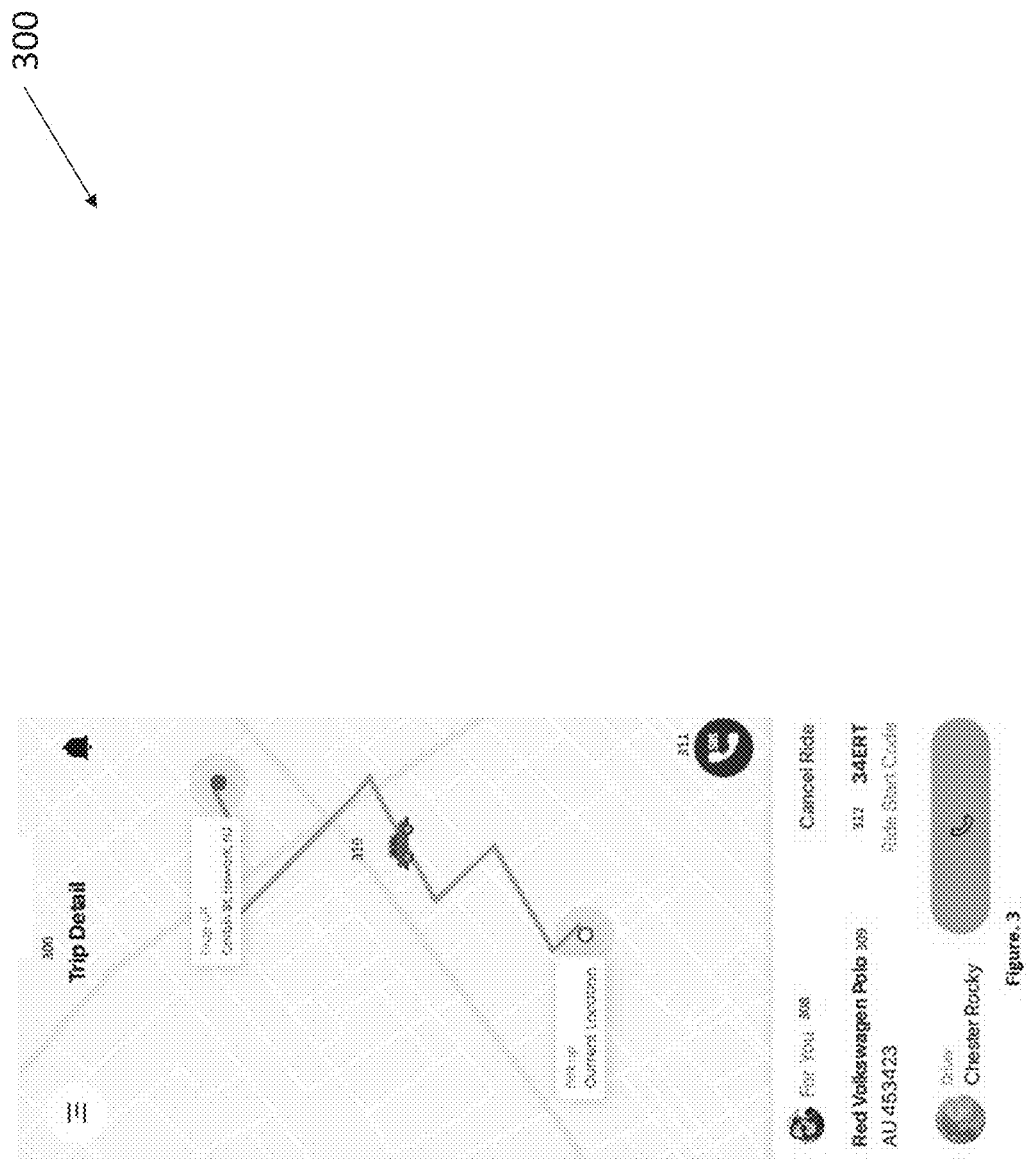
FIG. 3 is an example of a trip detail screen according to one or more embodiments of the present disclosure.

FIG. 3 is an example of a trip detail screen. In some examples, the trip details screen 300 would include the name of the rider 308 of the rideshare, a description of the vehicle 309, the current location 310 of the vehicle and the projected route, an SOS button 311 for calling emergency services, and the authentication code 312. In some examples, the trip details screen 300 is presented to the parent, the child and the driver at the same time. In some examples, the trip details screen 300 is incorporated into the Family view tab 200 which presents the same information for the parent.

Figure 4:
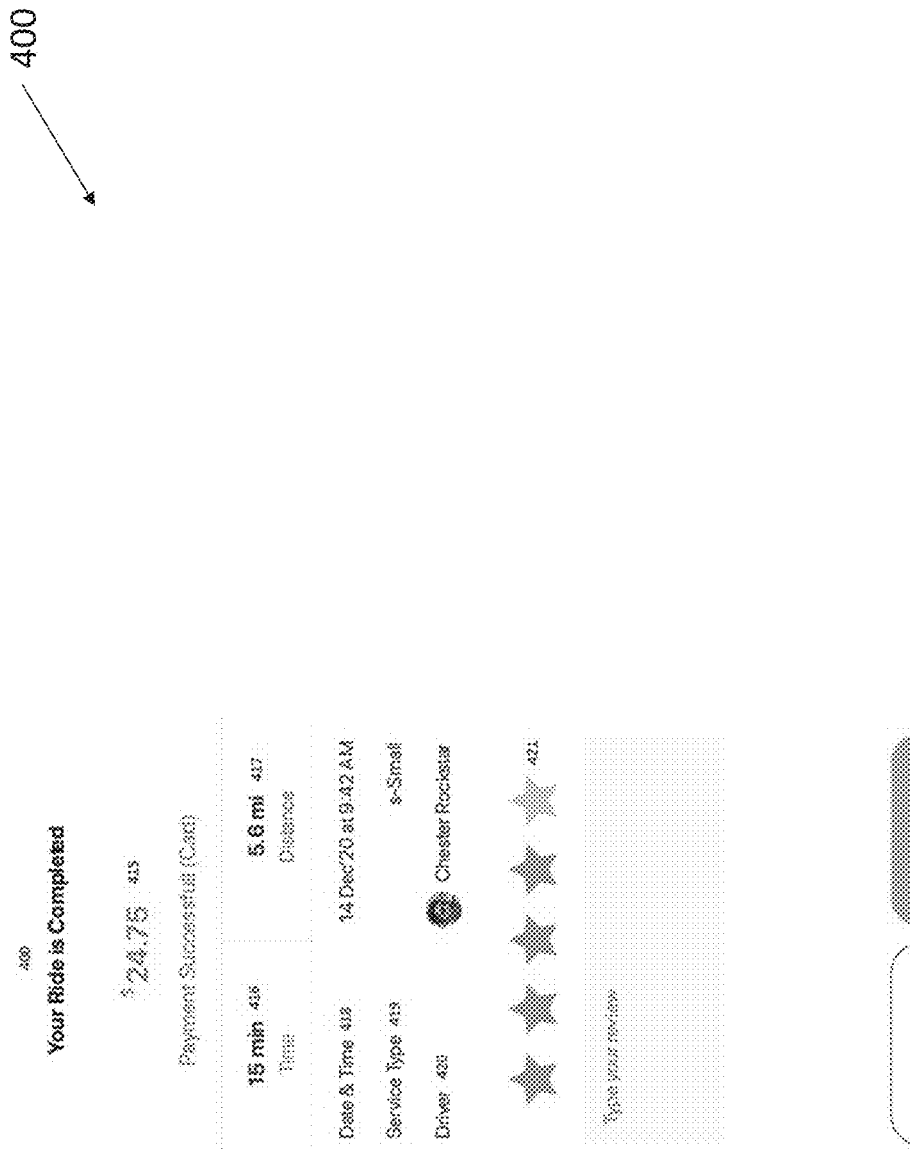
FIG. 4 is an example of a ride completion screen according to one or more embodiments of the present disclosure.

FIG. 4 is an example of a ride completion screen 400. The ride completion screen 400 can show several pieces of information such as the total cost of the trip 415. In a primary embodiment this could include all taxes, fees and the user can add a tip on top of that on a later screen. In other embodiments the cost of the trip 415 includes the cost of the tip to give a total cost charged to a user's credit card. The ride completion screen 400 can also show information such as the total time 416 and total distance 417 of the rideshare. It can also include the date and time 418 the service type 419 of the rideshare and the name of the driver 420. There can also be a space on the ride completion screen 400 to provide a review 421 for the driver for the benefit of other users requesting the rideshare services.

Figure 5:
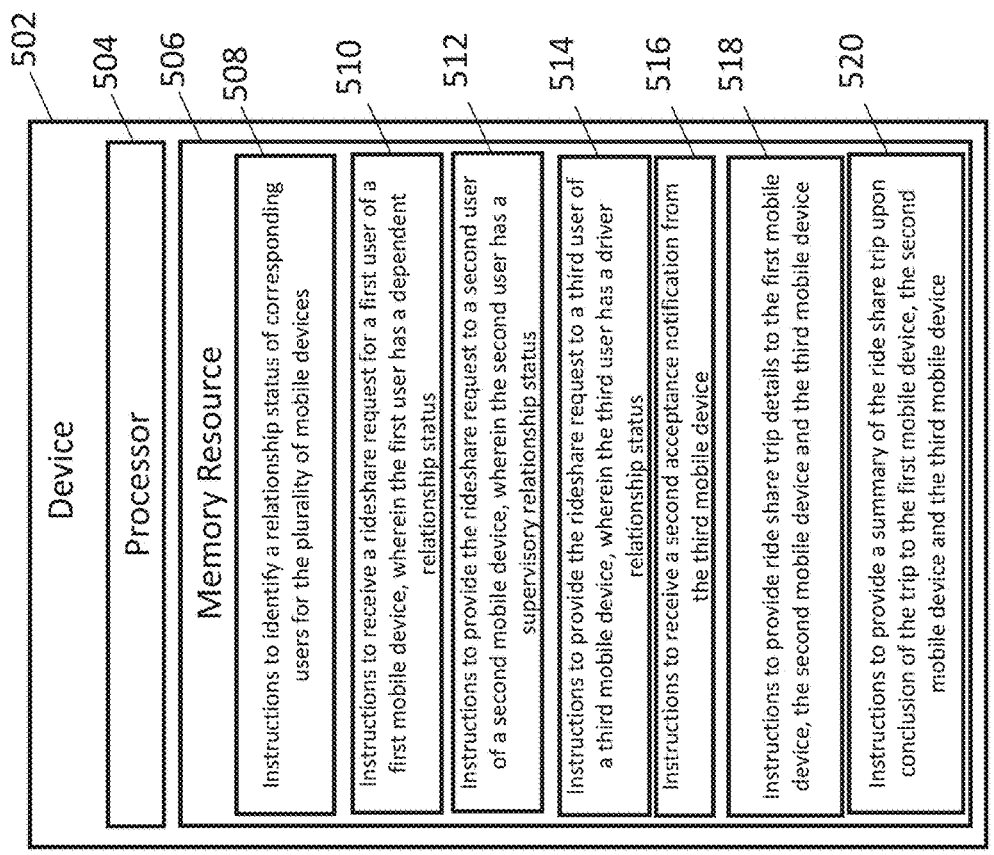
FIG. 5 illustrates an example of a device for requesting a rideshare according to one or more embodiments of the present disclosure.
Figure 5:
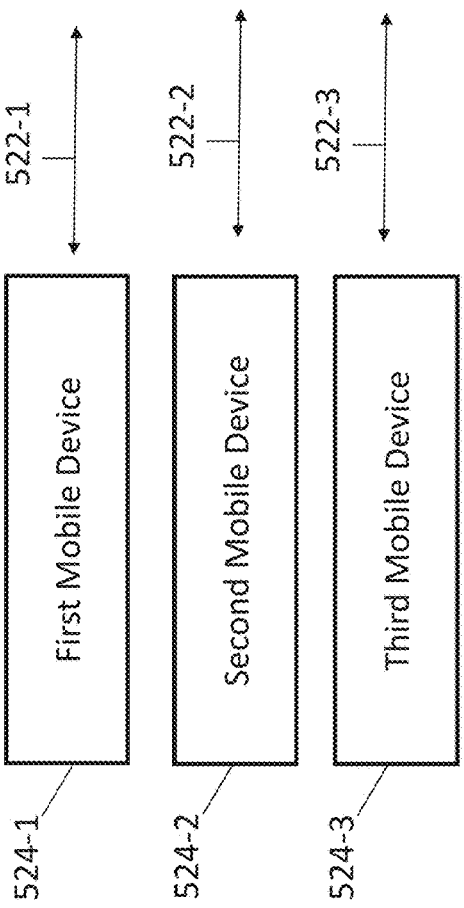

FIG. 5 illustrates an example of a device 502 for requesting a rideshare according to one or more embodiments of the present disclosure. In some examples, the device 502 is a computing device that includes a processor 504 and a memory resource 506 to store instructions 508, 510, 512, 514, 516, 518, 520 that are executed by the processor 504 to perform particular functions. In some examples, the device 502 is communicatively coupled to a plurality of mobile devices 524-1, 524-2, 524-3. For example, the device 502 can be communicatively coupled to the first mobile device 524-1 through a first communication path 522-1, a second mobile device 524-2 through a second communication path 522-2, and/or a third mobile device 524-3 through a third communication path 522-3.

In some examples, the communication paths 522-1, 522-2, 522-3 allows the device 502 to send and receive signals (e.g., communication signals, electrical signals, etc.) with the plurality of mobile devices 524-1, 524-2, 524-3. In some examples, the device 502 is able to execute the methods described herein (e.g., method 630 as referenced in FIG. 6, etc.). The device 502 includes instructions 508 stored by the memory resource 506 that is executed by the processor 504 to identify a relationship status of corresponding users for the plurality of mobile devices. As used herein, a relationship status can be a relationship between a first user and a second user. In some embodiments, the relationship can be a familial relationship such as a parent and a child or a child and an elderly parent. In this way, the relationship status can identify which user is paying and has authorization to make changes and which user includes restrictions. In this way, the device 502 can identify which users of which devices are able to perform particular functions described herein.

The device 502 includes instructions 510 stored by the memory resource 506 that is executed by the processor 504 to receive a rideshare request for a first user of a first mobile device, wherein the first user has a dependent relationship status. As described herein, a child or dependent user can send a request for a ride using a rideshare application. In this way, the dependent is a user with restricted function and is only able to perform particular functions with approval from a different user (e.g., supervisor, parent, guardian, etc.).

The device 502 includes instructions 512 stored by the memory resource 506 that is executed by the processor 504 to provide the rideshare request to a second user of a second mobile device, wherein the second user has a supervisory relationship status. As described herein, the supervisory relationship can be a guardian relationship where the second user is a legal guardian of the first user. In some embodiments, the approval of the second user is required for the first user to perform particular functions (e.g., request the ride, make payments, etc.). In some embodiments, the second mobile device can control approvals for rideshares through a family view. As described herein, a family view can allow a parent or supervisor to view and monitor a plurality of dependents. As described herein, the rideshare request can include a secondary adult contact. In some examples, the secondary adult contact is an adult contact for a supervisor to be located at the pick up or drop off locations. In this way, the driver can contact the adult contact at either or both of the pick up or drop off locations. As described herein, the rideshare request can be sent to the network by either the first mobile device or the second mobile device.

The device 502 includes instructions 514 stored by the memory resource 506 that is executed by the processor 504 to provide the rideshare request to a third user of a third mobile device, wherein the third user has a driver relationship status. As described herein, the driver can be provided with the rideshare request upon approval from the second user. In this way, the rideshare request can be approved by the supervisory user prior to providing the rideshare request to a driver. This can eliminate the possibility of a driver knowing there is a minor or dependent at a particular location. In some embodiments, an authentication code is generated that is presented to the first mobile device, the second mobile device, and the third mobile device which provides a validation for the rideshare. As described herein, the authentication code can be provided to the third mobile device, scanned by the first mobile device to be validated, and a confirmation of validation can be sent to the second mobile device.

The device 502 includes instructions 518 stored by the memory resource 506 that is executed by the processor 504 to provide ride share trip details 300 to the first mobile device, the second mobile device, and the third mobile device. As described herein, the ride share details 300 can include information related to a current ride of the first user. In this way, the first user, the second user, and/or the third user can receive the same ride share trip details 300. In some embodiments, the ride share trip details 300 can be displayed differently for the first user, the second user, and/or the third user based on different permissions set up by the second user. For example, the ride share trip details 300 can include limited functions that are designated by the second user. In some embodiments, the second mobile device has an option to connect to a rear facing camera located in an interior of a vehicle. The camera data can be provided as the ride share trip details 300 in some embodiments.

The device 502 includes instructions 520 stored by the memory resource 506 that is executed by the processor 504 to provide a summary of the ride share trip upon conclusion of the trip to the first mobile device, the second mobile device, and the third mobile device. In some embodiments, the summary of the ride share trip can include the information related to the trip upon conclusion of the trip. In this way, the summary can include a confirmation that the authentication information of the pick up and/or drop off was validated, the cost of the trip, the route of the trip, among other information.

Figure 6:
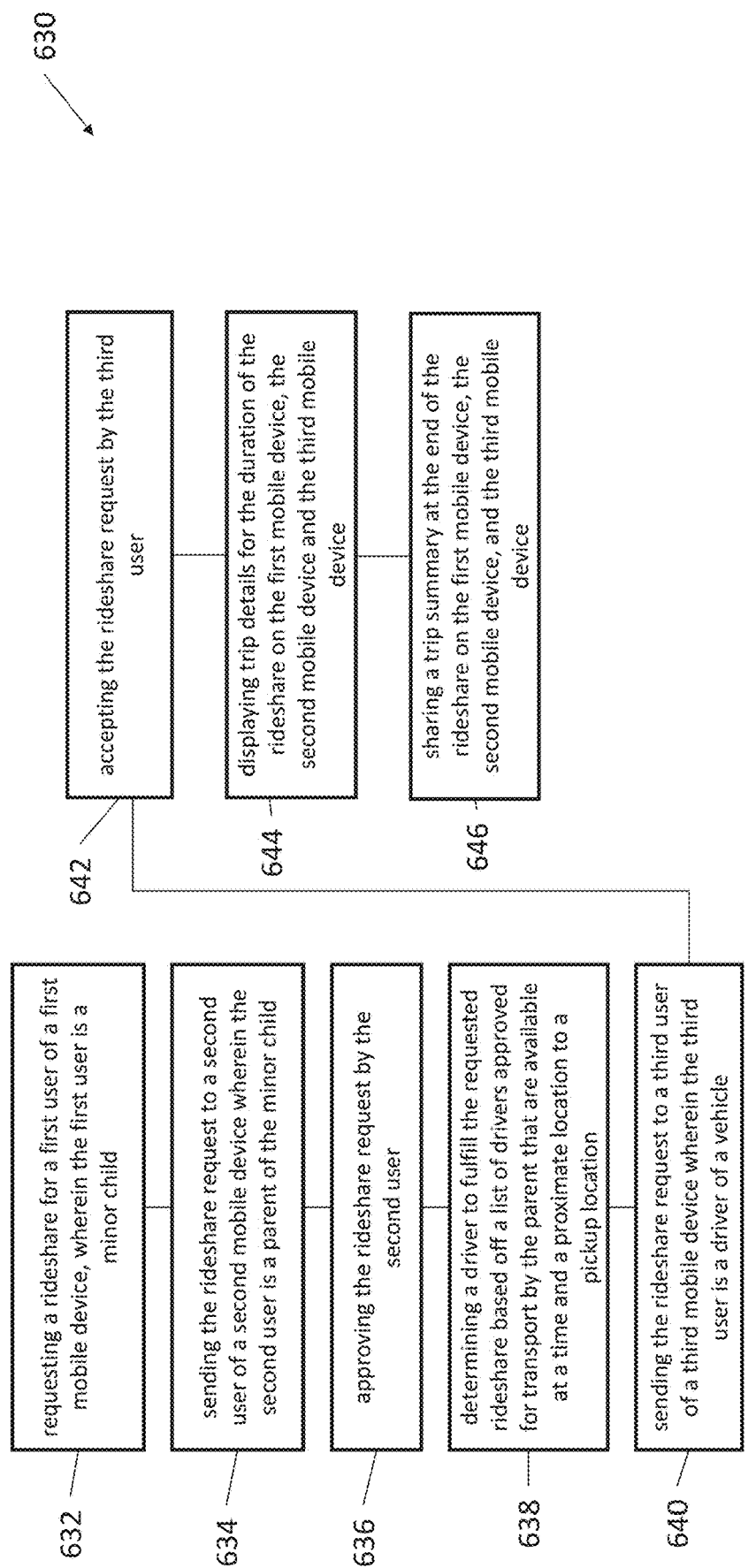
FIG. 6 illustrates an example of a method for requesting a rideshare according to one or more embodiments of the present disclosure.

FIG. 6 illustrates an example of a method 630 for requesting a rideshare according to one or more embodiments of the present disclosure. In some examples, the method 630 can be executed by a computing device or a network of computing devices.

At 632, the method 630 can include requesting a rideshare for a first user of a first mobile device, wherein the first user is a minor child. As described herein, a first user can be a minor child or other type of dependent that may not have full access to a rideshare application or may need approval to utilize the rideshare application. At 634, the method 630 can include sending the rideshare request to a second user of a second mobile device, wherein the second user is a parent of the minor child. In this example, the parent of the minor child can have the authority to provide some or all of the functionality of the rideshare application.

At 636, the method 630 can include approving the rideshare request by the second user. The second user can provide approval of the rideshare request by making a selection through the rideshare application as described herein. At 638, the method 630 can include determining a driver to fulfill the requested rideshare based off a list of drivers approved for transport by the parent that are available at a time and a proximate location to a pickup location. In some examples, the parent or second user can select a driver based on the information associated with the driver. For example, the parent can select a driver that utilizes particular camera technology or other types of safety technology. In some embodiments, the minor child's location and status is presented to the second user in a family view that can show a plurality of minors in the parent's family.

At 640, the method 630 can include sending the rideshare request to a third user of a third mobile device wherein the third user is a driver of a vehicle. At 642, the method 630 can include accepting the rideshare request by the third user. The driver that is selected can accept the rideshare request and receive the details of the ride.

At 644, the method 630 can include displaying trip details 300 for the duration of the rideshare on the first mobile device, the second mobile device, and the third mobile device. As described herein, the trip details 300 can be provided based on the features or functions provided by the driver, the permissions granted to the first mobile device, and/or the requests provided by the second mobile device. In this way, the second mobile device is able to monitor the interactions during the ride. At 646, the method 630 can include sharing a trip summary at the end of the rideshare on the first mobile device, the second mobile device, and the third mobile device. In some embodiments, the rideshare is paid for from a digital wallet presented to the second user. As described herein, the digital wallet is credited with rewards from a successful referral.

Figure 7:
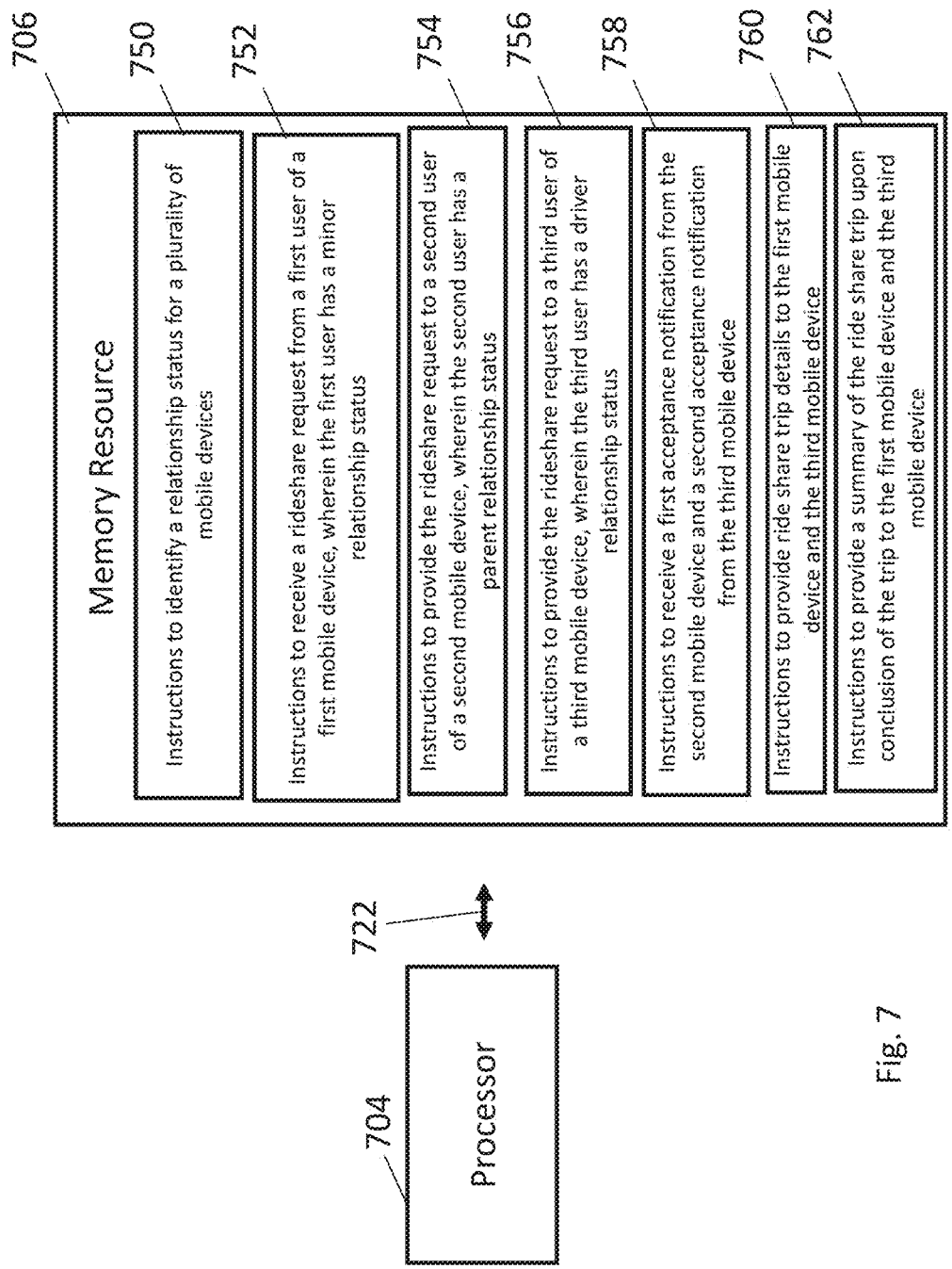
FIG. 7 illustrates an example of a memory resource for requesting a rideshare according to one or more embodiments of the present disclosure.

FIG. 7 illustrates an example of a memory resource 706 for requesting a rideshare according to one or more embodiments of the present disclosure. In some examples, the memory resource 706 can be a part of a computing device or controller that can be communicatively coupled to a computing system. For example, the memory resource 706 can be part of a device 502 as referenced in FIG. 5. In some examples, the memory resource 706 can be communicatively coupled to a processor 704 that can execute instructions 750, 752, 754, 756, 758, 760, 762, stored on the memory resource 706. For example, the memory resource 706 can be communicatively coupled to the processor 704 through a communication path 722. In some examples, a communication path 722 can include a wired or wireless connection that can allow communication between devices and/or components within a single device.

The memory resource 706 may be electronic, magnetic, optical, or other physical storage device that stores executable instructions. Thus, a non-transitory machine-readable medium (MRM) (e.g., a memory resource 406) may be, for example, a non-transitory MRM comprising Random-Access Memory (RAM), read-only memory (ROM), an Electrically Erasable Programmable ROM (EEPROM), a storage drive, an optical disc, and the like. The non-transitory machine-readable medium (e.g., a memory resource 706) may be disposed within a controller and/or computing device. In this example, the executable instructions 750, 752, 754, 756, 758, 760, 762, can be "installed" on the device. Additionally, and/or alternatively, the non-transitory machine-readable medium (e.g., a memory resource 706) can be a portable, external, or remote storage medium, for example, which allows a computing system to download the instructions 750, 752, 754, 756, 758, 760, 762 from the portable/external/remote storage medium. In this situation, the executable instructions may be part of an "installation package".

In some examples, the memory resource 706 includes instructions 750 to identify a relationship status for a plurality of mobile devices. In some examples, the memory resource 706 includes instructions 752 to receive a rideshare request from a first user of a first mobile device, wherein the first user has a minor relationship status. In some examples, the memory resource 706 includes instructions 754 to provide the rideshare request to a second user of a second mobile device, wherein the second user has a parent relationship status.

In some examples, the memory resource 706 includes instructions 756 to provide the rideshare request to a third user of a third mobile device, wherein the third user has a driver relationship status. In some examples, the memory resource 706 includes instructions 758 to receive a first acceptance notification from the second mobile device and a second acceptance notification from the third mobile device. In some embodiments, the first acceptance can be from the second user and the second acceptance notification can be from the third user.

In some embodiments, the driver can be selected by the second user. In some embodiments, the second user can be provided with a plurality of driver profiles. In some embodiments, the driver profile can include, but is not limited to, the name of the driver, the type of car, the safety record, ratings from previous trips, capabilities of the driver, camera availability, among other options. In some embodiments, the driver profile is verified by a platform using publicly available and submitted data. As described herein, the driver profile can include whether the driver provides access to a camera share. In these embodiments, a video feed of a camera located in an interior of a vehicle can be accessed by the second user to view the first user during the rideshare.

In some examples, the memory resource 706 includes instructions 760 to provide ride share trip details 300 to the first mobile device and the third mobile device. In some examples, the memory resource 706 includes instructions 762 to provide a summary of the ride share trip upon conclusion of the trip to the first mobile device and the third mobile device.

As used herein, the processor can include, but is not limited to: a central processing unit (CPU), an application specific integrated circuit (ASIC), a field programmable gate array (FPGA), a metal-programmable cell array (MPCA), a semiconductor-based microprocessor, or other combination of circuitry and/or logic to orchestrate execution of the instructions. In other examples, the device includes instructions, stored on a machine-readable medium (e.g., memory resource, non-transitory computer-readable medium, etc.) and executable by a processor. In a specific example, the processor utilizes a non-transitory computer-readable medium storing instructions that, when executed, cause the processor to perform corresponding functions.

In some examples, the memory resource can be a part of a computing device or controller that can be communicatively coupled to a computing system. The memory resource can be communicatively coupled to a processor that can execute instructions stored on the memory resource. For example, the memory resource can be communicatively coupled to the processor through a communication path. In some examples, a communication path can include a wired or wireless connection that can allow communication between devices and/or components within a single device.

The memory resource may be electronic, magnetic, optical, or other physical storage device that stores executable instructions. Thus, a non-transitory machine-readable medium (MRM) (e.g., a memory resource) may be, for example, a non-transitory MRM comprising Random-Access Memory (RAM), read-only memory (ROM), an Electrically Erasable Programmable ROM (EEPROM), a storage drive, an optical disc, and the like. The non-transitory machine-readable medium (e.g., a memory resource) may be disposed within a controller and/or computing device. In this example, the executable instructions can be "installed" on the device. Additionally, and/or alternatively, the non-transitory machine-readable medium (e.g., a memory resource) can be a portable, external, or remote storage medium, for example, which allows a computing system to download the instructions from the portable/external/remote storage medium. In this situation, the executable instructions may be part of an "installation package".

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combinations of the above embodiments, and other embodiments not specifically described herein will be apparent to those of skill in the art upon reviewing the above description.

The scope of the various embodiments of the disclosure includes any other applications in which the above elements and methods are used. Therefore, the scope of various embodiments of the disclosure should be determined with reference to the appended claims, along with the full range of equivalents to which such claims are entitled.

In the foregoing detailed description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the detailed description, with each claim standing on its own as a separate embodiment.

What is claimed:

1. A system for requesting a rideshare, comprising:
a centralized computing device;
a first mobile device comprising instructions to:
create an organization view of a plurality of groups of users where the groups are composed of a group of dependents and a group of supervisors;
identify an administrator of the organization view, wherein the administrator utilizes the first mobile device to alter the organization view by adding, removing, and reorganizing users from the plurality of groups of users through a user interface of the first mobile device;
identify a relationship status of corresponding users by identifying which supervisor from the group of supervisors are responsible for which dependent from the group of dependents for a plurality of mobile devices;
receive a rideshare request for a first user of the first mobile device, wherein the first user has a dependent relationship status to a second user and is a dependent from the group of dependents;
process location data of the first mobile device and upload the location data to the centralized computing device;
receive an authentication code from the centralized computing device;
scan the authentication code to validate the rideshare request;
receive, from the centralized computing device, a status of the rideshare including location, speed, and direction of a motor vehicle as it travels from a pickup location to a drop-off location based on the location data;
receive, from the centralized computing device, a summary of the rideshare to the first user;
a second mobile device comprising instructions to:
receive, from the centralized computing device, the rideshare request to the second user of the second mobile device in a family view of all dependent users to the second user for approval of the rideshare request, wherein the second user has a supervisory relationship status to the first user, and is a supervisor from the group of supervisors that is an identified supervisor responsible for the first user, and wherein the second user inputs a contact number for a secondary adult contact at the drop-off location utilizing a user interface of the second mobile device;
send, to the centralized computing device, a first acceptance notification from the second mobile device approving the rideshare request for the first user;
access, from the centralized computing device, pictures and video clips from a rear facing camera of an interior of the motor vehicle to allow the second user to supervise activity of the first user during the rideshare utilizing the second mobile device;
receive rideshare details from the centralized computing device during the rideshare to update the second user on the status of the rideshare including location, speed, direction of the motor vehicle as it travels from the pickup location to the drop-off location;
receive, from the centralized computing device, a summary of the rideshare trip to the second mobile device;
a third mobile device with instructions to:
receive, from the centralized computing device, the rideshare request for the first user to a third user of the third mobile device, wherein the third user has a driver relationship status;
capture a picture of a driver's license of the third user;
upload the picture of the driver's license to the centralized computing device;
send, to the centralized computing device, a second acceptance notification from the third mobile device accepting the rideshare request by the third user
receive, from the centralized computing device, the pickup location where the first user is located and the authentication code that is presented to the first mobile device and the third mobile device;
wherein the centralized computing device comprises instructions to:
processes the picture of the driver's license to extract personal identifying information for verification against a publicly available data to verify the third user is qualified to operate a motor vehicle;
generate the authentication code between the first mobile device and the third mobile device;
send the authentication code to the first mobile device and the third mobile device;
validate the authentication code by comparing the generated authentication code to the captured authentication code;
provide rideshare details during the rideshare to the third mobile device to update the third user on the status of the rideshare including location, speed, and direction of the motor vehicle as it travels from the pickup location to the drop-off location;

provide the secondary adult contact number to the third mobile device at a conclusion of the rideshare to notify the secondary adult contact of an arrival of the first user and provide the summary of the rideshare trip to the third user that details a distance traveled, a cost for the rideshare, and payment options including a digital wallet for storing and utilizing currency.

2. The system of claim 1, comprising capturing, by the first mobile device, an image of the authentication code to verify the authentication code.

3. The system of claim 1, comprising sending, in response to an image of the authentication code being verified, a notification to the second mobile device.

4. The system of claim 1, wherein the rideshare details includes a location of the vehicle, a description of the vehicle, the authentication code, a verification that the authentication code was scanned and authenticated, and a proposed route of the driver.

5. The system of claim 1, comprising sending, by the third mobile device, to contact information of a secondary supervisor at the drop-off location to notify the secondary supervisor that the first user is present at the drop-off location.

6. The system of claim 1, wherein the authentication code is the only identifying information of the first user provided to the driver.

* * * * *